Patented July 4, 1944

2,352,659

UNITED STATES PATENT OFFICE 2,352,659

PRINTING INK AND METHOD OF PREPARING THE SAME

Harvey A. Sell, Rutherford, N. J., and Herbert Cole, New York, N. Y., assignors, by direct and mesne assignments, to Wm. Walter Frankel, New York, N. Y., and Jacob Logan Fox, Chicago, Ill., as trustees No Drawing. Application March 14, 1938,
Serial No. 195,848

5 Claims. (Cl. 260—39)

The present invention although more especially applicable in the art of printing, has utility in a wide variety of fields, where film coatings are to be securely laid upon a surface and more particularly where such film inherently serves as the bonding means with respect to the surfaces which it engages.

Among the objects of the invention are to provide a printing ink which may be stored for long periods without deterioration due to hardening, drying, caking or otherwise, which may have a high solid content and which may be caused to dry, harden or set on the sheet almost instantly, with the avoidance of smudging or offsetting and with the elimination of the need for slip-sheeting.

Another object is to provide a printing ink of the above character which does not include in its composition any nitro-cellulose and other highly inflammable ingredients, and which, is not readily inflammable or combustible and in use dispenses with the need for costly safeguards to prevent fire or for complicated ventilating equipment or mechanism to carry off more or less toxic vapors or fumes.

The principle of the present invention is to utilize as an ingredient of the printing ink and preferably as the vehicle for the pigment, a resin, the polymerization of which has been controlled in the preparation thereof, so that the resin ingredient of the ink in the container is but partially polymerized. After application of the ink to the sheet in printing, the polymerization of the resin is rapidly completed, preferably by the application of heat to cause the ink film immediately to be completely dried, and set upon the sheet, without the possibility of smudging or offsetting.

While the use of such partially polymerized resin is advantageous when added as a further ingredient in printing ink of the type commonly in use in which the vehicle is of linseed oil, it is preferable to utilize such resin itself, dissolved in a suitable solvent as the vehicle for the pigment.

Among numerous alternative synthetic resins useful for the purpose are some that will inherently remain partially polymerized until the setting is completed by the application of heat, and others the polymerization of which will inherently progress even at room temperatures. In the latter case a retardant is used to arrest the progress of polymerization until the printing or other film is about to be laid down, at which time a suitable catalyst is preferably added to rapidly complete the polymerization under heat when the film has been applied.

The invention may be carried out in a wide variety of embodiments, dependent upon the particular type of printing or sheet upon which the printing is to be performed, and the characteristics desired of the resultant product. Suitable for the purpose are a wide variety of synthetic resins including the urea-formaldehyde type, the alkyd type and the phenol type, the polymerization of each of which may be controlled, so that prior to printing, the resin ingredient of the ink is but partially polymerized, the polymerization being readily completed by the application of heat to the sheet after printing the same.

By way of compliance with the statutory requirements, an illustrative embodiment of printing ink will now be set forth in detail which involves an ingredient of synthetic resin of the type that requires a retardant to arrest polymerization and, if desired, a catalyst to be added before use to promote polymerization under heat. A urea formaldehyde resin is prepared by refluxing a mixture of urea and conventional aqueous formaldehyde solution, and then distilling under a good vacuum. In the course of such distillation, and preferably about midway during its progress, there is added a very small percentage (seven tenths of one per cent by weight, is generally sufficient), of sodium acetate which serves as the retardant to arrest polymerization. Before the distillation is completed, and while there is still a residue of water, it is preferable to add a solvent of higher boiling point than water which serves as a thinning agent and to continue the distillation until substantially all of the water has been driven off. An illustrative example of such solvent is ethylene glycol monoethyl ether. As a result of this operation a solution of partially polymerized resin is produced in which the solid content is in the neighborhood of 80 per cent, the remaining 20 per cent being non-aqueous solvent.

While the urea and formaldehyde may be mixed in any of a wide variety of proportions dependent upon use, highly satisfactory results are obtained by the use of a relatively low proportion of formaldehyde, illustratively 1.84 moles thereof to one mole of urea. By keeping the proportion of formaldehyde low, the cost of the resin is kept down and the disagreeable odor due to an excess of formaldehyde is substantially obviated. The sodium acetate is added as above set forth in the course of preparing the resin, to serve as a retardant and prevent completion of the polymerization at room temperature.

In producing the printing ink, the resin solution set forth is admixed with a pigment of suitable character, usually carbon black which may, if desired, be dispersed in a suitable dispersing agent such as water or ethylene glycol monomethyl ether. The printing ink prepared by thoroughly admixing the two ingredients set forth, namely the resin solution and the pigment, preferably in proportions of three parts by weight of solution to one part of pigment, has a high solid content, the solvent ingredient being well under 35 per cent, and desirably as little as 15 per cent by weight. The solid content is higher than that of any other known heat drying ink and the ink has excellent covering qualities.

The ink, as above set forth, when stored in cans or other vessels, is not subject to deterioration as by progressive polymerization and it maintains its consistency for long periods even though kept in a warm room. The ink described, does not constitute a fire hazard either when stored or in the course of application, because it has no readily inflammable or readily combustible ingredients.

Shortly before the ink is to be used in printing, it is preferably mixed with a small proportion (one tenth of one per cent is ordinarily sufficient) of accelerator or catalyzer, desirably ammonium chloride, which is inexpensive and relatively non-corrosive, or, if desired, monochloracetic acid. These substances promote the rapid polymerization of the urea-formaldehyde resin which had been retarded by the incorporation of sodium acetate therewith and thereby making the ink insoluble in water.

The ink is applied in the usual manner for printing, but due to the character of solvent used and the relatively small proportion thereof, the latter becomes readily absorbed in the sheet to which the printing is applied and very little vapor passes off in the course of drying, so that with the use of the ink set forth, the need for complicated ventilating and fire protective equipment heretofore commonly used to carry off noxious and inflammable fumes from the ink is eliminated.

The printing machine is preferably equipped with a gas flame heat dryer for the printed sheet. The instant application of such heat is sufficient completely to dry or set the ink. The printed sheet instantly becomes thoroughly dry and set by completion of the polymerization as a result of this heat application, to provide a permanent coating to the paper, which cannot be rubbed off by friction without destroying the paper itself. There is no possibility of smudging and the sheets, even though of highly calendered stock may be directly piled upon each other without slip sheeting or other safeguards against offsetting or sticking.

While the ink above set forth is especially suitable for rotogravure printing, because of its relatively non-inflammable, non-combustible and quick setting characteristic, it is also suitable for letter press printing, although in that application, it would be preferable to use a urea resin compatible with solvents of higher boiling point than those above set forth, such for instance, as the ethers of di-ethylene glycol of which di-ethylene glycol monobutyl ether is an example, or the acetates thereof.

Another embodiment of the invention, which results in a printing ink suitable more especially for letter press printing involves the use of an alkyd resin, illustratively of the "Glyptal" type, The alkyd resin used in this application is preferably modified by combination therewith of the fatty acid of an oil, which may be of the drying, the semi-drying or the non-drying type and which replaces part of the phthalic anhydride. Such oil will retard polymerization of the resin to extent sufficient to keep the same from setting while stored. Preferably two parts of the resin are used to one part of solvent therefor, such as mineral oil of relatively high boiling point, for instance liquid petrolatum of the U. S. Pharmacopeia 11. The pigment is added in the proportions and manner previously set forth. No accelerator or catalyst is required, but the polymerization is promptly completed by application of heat to the freshly printed sheet.

In another embodiment phenolic resins are used, which are dissolved in a suitable solvent of which liquid petrolatum such as U. S. Pharmacopeia 11, or di-ethylene glycol monobutyl ether or its acetate are examples. To facilitate solution the resin may be modified by treatment with natural oils, fatty acids thereof, other resins or natural or synthetic esters. Thus prepared, the resin will not polymerize at room temperature to such extent as to set while stored.

It is preferred to mix a small proportion of the phenol resin set forth with the alkyd resin above described, because such admixture expedites setting under heat.

The term "polymerization" as used in the specification and claims is not intended to be limited to any closely defined technical definition, but is intended to embrace within its scope the phenomenon of setting of a resin, whether this be by mere condensation, by a combined condensing and polymerization action, or by polymerization alone.

Subject matter not specifically claimed herein, and more especially, the alkyd resin embodiment, is claimed in our copending application Serial No. 369,122, filed December 7, 1940.

It will thus be seen that there are herein described compositions and methods in which the several features of this invention are embodied, and which in practice attain the various objects of the invention and are well suited to meet the requirements of practical use.

As many changes could be made in the above compositions and methods and many apparently widely different embodiments of this invention could be made without departing from the scope of the claims, it is intended that all matter contained in the above description shall be interpreted as illustrative and not in a limiting sense.

Having thus described my invention, what we claim as new and desire to secure by Letters Patent is:

1. As a composition of matter, a printing ink suitable for letter press work, consisting of an admixture of substantially three parts by weight of partially polymerized synthetic urea formaldehyde resin dissolved in a small proportion of non-aqueous solvent and one part by weight of pigment, the resin ingredient serving as the vehicle for the pigment.

2. The printing ink as claimed in claim 1 in which the resin is the product of condensation of 1.84 moles of formaldehyde and one mole of urea.

3. As a composition of matter, a printing ink suitable for letter press work consisting of a vehicle of partially polymerized urea-formaldehyde resin, substantially free from water, and comprising a solid content in the neighborhood of 80 per cent, the remainder being a non-aqueous solvent and having admixed therewith a pigment there being approximately three parts by weight of vehicle to one part of the pigment.

4. A resin composition to serve as the vehicle for a printing ink suitable for letter press work and, consisting of a partially polymerized compound of formaldehyde and urea, having a small content of sodium acetate, which serves to arrest the further polymerization, said resin being dissolved in a compatible solvent, the composition having in the order of 80 per cent of solid matter.

5. The method of preparing a printing ink suitable for letter press work, which comprises the refluxing of a mixture of urea and formaldehyde, the distillation thereof under sub-atmospheric pressure, the addition in the course of distillation of a small percentage of sodium acetate, the addition in the course of distillation of a solvent of boiling point higher than water, the removal of substantially all of the water by distillation, and the mixture of a pigment with the resultant product.

HARVEY A. SEIL.
HERBERT COLE.